US010275162B2

(12) United States Patent
Kan et al.

(10) Patent No.: US 10,275,162 B2
(45) Date of Patent: Apr. 30, 2019

(54) METHODS AND SYSTEMS FOR MANAGING DATA MIGRATION IN SOLID STATE NON-VOLATILE MEMORY

(71) Applicant: DELL PRODUCTS L.P., Round Rock, TX (US)

(72) Inventors: Lip Vui Kan, Hillbrooks (SG); Young Hwan Jang, Singapore (SG)

(73) Assignee: Dell Products L.P., Round Rock, TX (US)

( * ) Notice: Subject to any disclaimer, the term of this patent is extended or adjusted under 35 U.S.C. 154(b) by 132 days.

(21) Appl. No.: 15/631,773

(22) Filed: Jun. 23, 2017

(65) Prior Publication Data
US 2018/0373428 A1    Dec. 27, 2018

(51) Int. Cl.
| G06F 13/00 | (2006.01) |
| G06F 3/06 | (2006.01) |
| G06F 12/122 | (2016.01) |
| G06F 12/02 | (2006.01) |

(52) U.S. Cl.
CPC ............ *G06F 3/061* (2013.01); *G06F 3/0655* (2013.01); *G06F 3/0688* (2013.01); *G06F 12/122* (2013.01); *G06F 12/0253* (2013.01); *G06F 2212/69* (2013.01); *G06F 2212/7205* (2013.01)

(58) Field of Classification Search
CPC ......... G06F 2212/7205; G06F 2212/69; G06F 12/0253; G06F 12/122; G06F 3/0688; G06F 3/0655; G06F 3/061
See application file for complete search history.

(56) References Cited

U.S. PATENT DOCUMENTS

| 7,774,525 B2 | 8/2010 | Farharn et al. |
| 8,239,618 B2 | 8/2012 | Kotzur et al. |
| 8,266,354 B2 | 9/2012 | Farhan et al. |
| 8,671,241 B2 | 3/2014 | Molloy |
| 8,938,584 B2 | 1/2015 | Nelogal et al. |
| 9,081,712 B2 | 7/2015 | Kotzur |
| 9,280,497 B2 | 3/2016 | Berke et al. |
| 9,395,924 B2 | 7/2016 | Cohen et al. |
| 9,524,108 B2 | 12/2016 | Hia et al. |
| 2013/0297894 A1 | 11/2013 | Cohen et al. |

(Continued)

OTHER PUBLICATIONS

Canepa, "Anatomy of a High Performance, Hierarachical FTL Architecture", Seagate, Flash Memory Summit, 2015, 16 pg.

(Continued)

*Primary Examiner* — Charles Rones
*Assistant Examiner* — Han V Doan
(74) *Attorney, Agent, or Firm* — Egan Peterman Enders Huston

(57) ABSTRACT

Methods and systems that may be implemented for managing data migration from relatively higher performance and higher endurance solid state non-volatile memory media to relatively lower performance and lower endurance solid state non-volatile memory media. The disclosed methods and systems may be implemented to reduce write amplification that occurs to solid state non-volatile memory media of a memory device by using frequency of LBA update as a parameter for controlling and optimizing data eviction from a relatively higher performance and higher endurance input buffer section in the receiving front of a memory device to a relatively lower performance and lower endurance main memory section of the same memory device.

20 Claims, 7 Drawing Sheets

(56) References Cited

U.S. PATENT DOCUMENTS

2014/0181327 A1 6/2014 Cohen et al.
2014/0325117 A1 10/2014 Canepa et al.
2017/0161191 A1 6/2017 Cohen et al.
2017/0277444 A1 9/2017 Canepa et al.

OTHER PUBLICATIONS

Lee et al., "Reducing Write Amplification of Flash Storage Through Cooperative Data Management With NVM", $32^{nd}$ International Conference on Mass, May 2016, 20 pg.

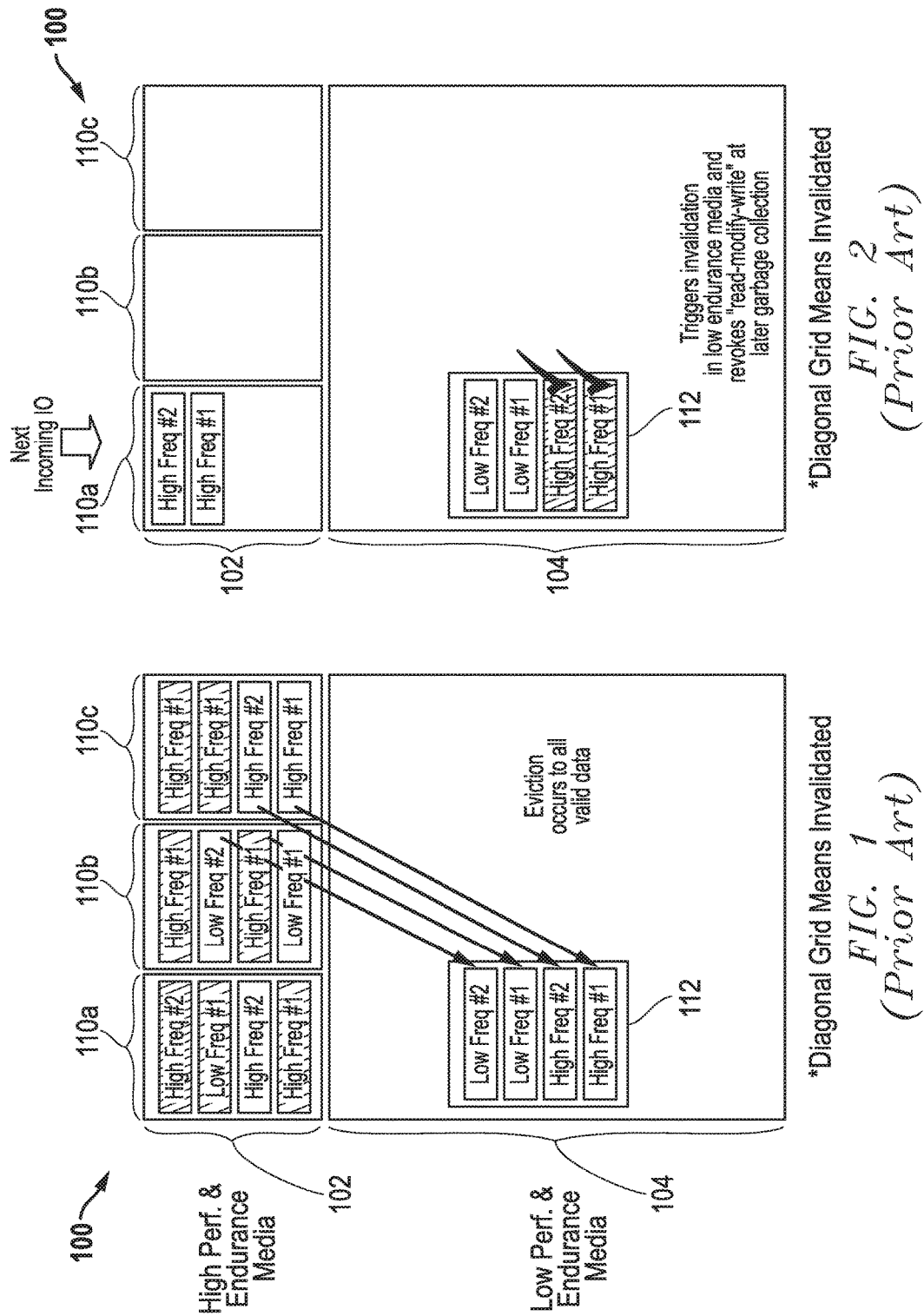

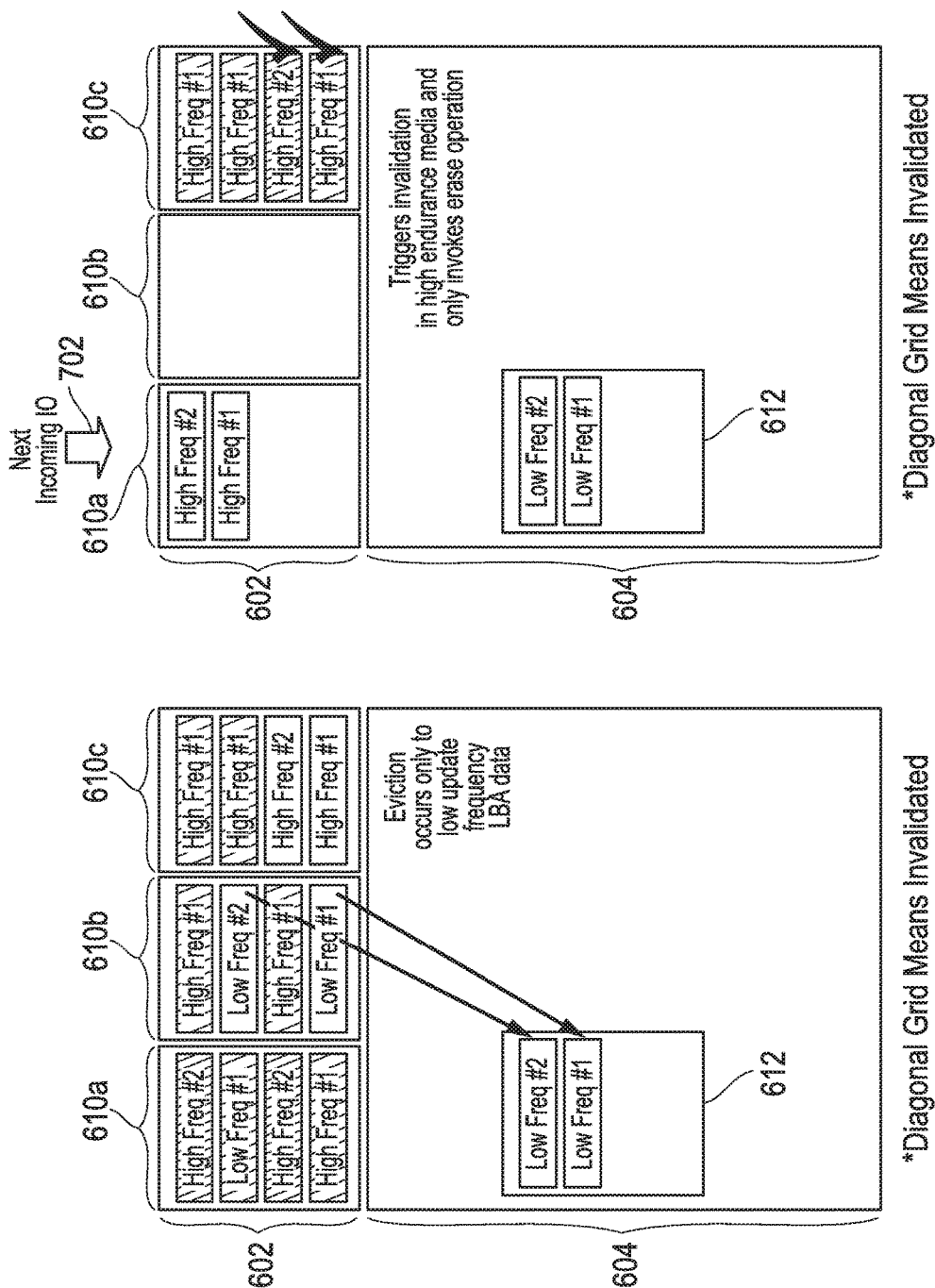

METHODS AND SYSTEMS FOR MANAGING DATA MIGRATION IN SOLID STATE NON-VOLATILE MEMORY

FIELD

This invention relates generally to non-volatile memory and, more particularly, to data migration in solid state non-volatile memory.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems employ solid-state storage devices, (e.g., solid-state drives) to store data and programs of instructions for later retrieval. A solid-state drive (SSD) is a data storage device that uses solid-state memory to store persistent data. A SSD may emulate a hard disk drive interface to easily replace a hard disk drive. SSDs often use NAND flash memory as an underlying storage medium. A page is the smallest NAND unit which may be written, and one of the limitations for writing to most NAND flash memory is that a page of memory must be empty before it is written to. Thus, if data exists in the page, the page must be erased before data is written to it. A SSD may track data stored thereon using a Flash Translation Layer (FTL) mapping table that maintains the location in the SSD for each data segment (data block) corresponding to a logical block address (LBA) with which it is written. In Flash memory, a data block is the smallest unit size that may be erased in an SSD. Accordingly, two approaches may typically be used to rewrite data to an SSD. If the new data is smaller than the smallest erase unit size of the SSD (e.g., a FTL block), the existing data is read and merged with the new data, with the merged data written to a new location in the SSD. After data is written to the new location, the old location is invalidated. If the new data is larger than the smallest erase unit size of the SSD, new data is written to a different location of the flash memory and the old location is invalidated.

Over time, the SSD may include many "dirty" blocks that contain invalid data. In order to continue writing to blocks, a controller of the SSD "cleans" these blocks by performing a function known as garbage collection. Garbage collection typically includes the act of determining memory blocks that include a threshold level amount of invalid data. Valid data from such blocks is collected, aggregated, and written to new SSD memory locations, and the old blocks are erased.

Traditional single-level cell (SLC) NAND media stores one bit per cell. However, NAND memory has been scaled up in density by putting more bits in a single cell at the expense of lower media endurance and degraded performance. Examples of denser types of NAND media include what is commonly referred to as multi-level cell (MLC) memory having two bits per cell, triple-level cell (TLC) memory having three bits per cell, and quad-level cell (QLC) memory having four bits per cell. Scaling up the number bits stored per cell introduces degrading performance as well as lower endurance of the media, and the performance and endurance level of current QLC memory devices is only marginally acceptable for current memory applications. Higher performance media has been placed in the data-receiving front of a NAND memory device as an input data buffer for a main section of lower performance media of the NAND memory device. In such a configuration, the SSD controller empties the higher performance media buffer by evicting existing data to the lower performance media. However, in such a configuration the endurance level of the lower performance media may be exceeded during memory device operation, especially where the lower performance media has an endurance level as low as 100 to 300 program & erase cycles, e.g., such as is the case with existing QLC memory.

FIG. 1 is a simplified representation of NAND media of a conventional memory device 100 that includes an input buffer section 102 of higher performance/higher endurance SLC media and a main memory section 104 of lower performance/lower endurance QLC media. As shown in FIG. 1, buffer 102 currently includes multiple memory blocks 110a to 110c that each contain FTL pages of valid (non-hashed) and invalid (hashed) data. In this case, memory block 110a includes three pages of high frequency LBA update data (e.g., LBA data that is updated by writing at a frequency greater or equal to 3 sigma distributed frequency) that have all been invalidated and one page of invalid low frequency LBA update data (e.g., LBA data that is updated for writing at a frequency less than 3 sigma distributed frequency), memory block 110b includes two pages of invalid high frequency update data and two pages of valid low frequency LBA update data, and memory block 110c includes two pages of invalid high frequency LBA update data and two pages of valid high frequency LBA update data. As shown, the two valid (non-hashed) data pages of memory block 110c may contain high frequency LBA update data #1 and #2 that has replaced previously existing high frequency update LBA data #1 and #2 of various other, now invalidated, data pages contained in memory blocks 110a, 110b and 110c as shown. Since high frequency LBA update data is written to the NAND media of memory device 100 more often, buffer 102 may at any time contain more invalidated pages of high frequency LBA update data than pages of invalidated low frequency LBA update data. The conventional memory device 100 does not monitor the relative frequency of LBA update, and is unaware of which data pages contain high frequency LBA update data and low frequency LBA update data.

Still referring to FIG. 1, a garbage collection cycle begins by collecting, aggregating, and writing valid LBA data from pages of the various memory blocks 110a to 110c of input buffer section 102 to new SSD memory locations in main memory section 104. In the illustrated example of FIG. 1, valid low frequency LBA update data #1 and #2 from the two pages of memory block 110b have been aggregated with valid high frequency LBA update data #1 and #2 of pages from memory block 110c, and written together to a memory block 112 of main memory section 104. The memory blocks 110a to 110c of buffer section 102 are then erased to allow new incoming LBA data to be written to buffer section 102 as shown in FIG. 2. In this case, new incoming high frequency LBA update data #1 and high frequency LBA update data #2 is subsequently written to two data pages of memory block 110a, which causes invalidation of corresponding existing high frequency LBA update data #1 and #2 of two pages of memory block 112 of main memory section 104 as illustrated by the check marks. Because invalidated high frequency LBA update data pages now reside in memory block 112 of lower performance/lower endurance QLC media main memory section 104, the valid low frequency LBA update data in the remaining two pages of memory block 112 in the lower performance/lower endurance QLC media will be read and rewritten (with other currently valid LBA data pages) to a new data block in main memory section 104 (and memory block 112 erased) during the next garbage collection cycle.

SUMMARY

Disclosed herein are methods and systems for managing data migration (e.g., such as valid data eviction) from relatively higher performance and higher endurance solid state non-volatile memory media to relatively lower performance and lower endurance solid state non-volatile memory media. Examples of such solid state non-volatile memory media include, but are not limited to, Not And (NAND) solid state flash memory media that is employed in memory devices such as solid state drives (SSDs), memory cards, USB flash drives, etc. In one embodiment, the disclosed methods and systems may be advantageously implemented to reduce write amplification (i.e., equal to total data written to the flash memory/data written by the host) to solid state non-volatile memory media by using frequency of LBA update as a parameter for controlling and optimizing data eviction by reducing garbage collection writes from a relatively higher performance and higher endurance input buffer section (e.g., SLC memory media) in the receiving front of the memory device to a relatively lower performance and lower endurance main memory section (e.g., MLC, TLC, QLC, etc. memory media) of the same memory device. In this regard, the disclosed methods and systems may be implemented to reduce total garbage collection-induced data writes (and therefore reduce write amplification) by preventing eviction of high frequency LBA update data from a relatively higher performance and higher endurance input buffer section to a relatively lower performance and lower endurance main memory section. The disclosed methods and systems may be so implemented using any type of memory media that may be segregated into separate high endurance (or high performance/high endurance) and low endurance (or low performance/low endurance) portions. Besides NAND flash memory, other examples of suitable solid state memory media types include Phase Change Memory (PCM), resistive random access memory (Re-RAM), etc.

The disclosed methods and systems may be implemented, for example, to compensate for the lower endurance of main memory section solid state non-volatile media by using the higher endurance solid state non-volatile media of an input buffer section of the memory device to retain all invalidated high frequency LBA update data, while at the same time allowing the higher performance input buffer memory to accommodate an increased storage interface bandwidth for the memory device. In one example, the disclosed methods and systems may be used to handle data migration from high endurance solid state non-volatile media having a media endurance level greater than about 30,000 cumulative program-erase (P/E) cycles to low endurance solid state non-volatile media having media endurance levels of less than about 1000 cumulative P/E cycles (and alternatively from about 1000 cumulative P/E cycles down to about 100 cumulative P/E cycles, and further alternatively from about 1000 cumulative P/E cycles to about 300 cumulative P/E cycles). It will be understood that the above P/E cycle values are exemplary only. Further, although NAND flash memory media examples are described herein in which endurance and performance levels vary correspondingly, the disclosed methods and systems may be implemented handle data migration (e.g., eviction) from any relatively higher endurance solid state memory media to a relatively lower endurance solid state memory media, regardless of any relative difference in performance between the two types of memory.

In one exemplary embodiment, clustering of data residing in the higher performance/higher endurance solid state non-volatile media may be controlled based on frequency of LBA updates received from a host programmable integrated circuit when data from the higher performance/higher endurance solid state non-volatile media is evicted to lower performance/lower endurance solid state non-volatile media, e.g., by a non-volatile memory controller such as a SSD controller. For example, data may be clustered by two or more different ranges of LBA update frequency so that only low frequency LBA update data is evicted to lower performance/lower endurance solid state non-volatile media. This is in contrast to the conventional way of evicting data of all LBA update frequencies together with each other to low endurance solid state non-volatile media, which results in data of various LBA update frequencies mixed together in the same block so when the garbage collection function is triggered, many "read-modify-write" operations need to be employed to move the valid high frequency LBA update data residing in the lower performance/lower endurance solid state non-volatile media of the main memory section before erasing memory blocks in the lower performance/lower endurance solid state non-volatile media that contain invalid data. Instead, the disclosed methods and systems may be employed to cluster non-evicted higher frequency LBA update data in the higher performance/higher endurance solid state non-volatile media of the input data section so that the number of "read-modify-write" operations to evicted data to the lower performance/lower endurance solid state non-volatile media of the main memory section will be reduced significantly and therefore less wear will occur to the lower performance/lower endurance solid state non-volatile media of the main memory section.

In one exemplary embodiment, a sequence of choosing the victim data for eviction from the input buffer section to the main memory section may be used to select the data from the lowest updated frequency LBA data for eviction, while leaving the highest frequency LBA update data residing in the higher performance/higher endurance solid state non-volatile media buffer section and only invalidating data that is updated. In this way, the validated data may be formed into unified blocks, reducing valid pages to a "copy-modify-write" operation. When there is any incoming LBA data write input to a memory device from a host programmable integrated circuit, a memory controller of the memory device may monitor and keep track of LBA data update frequency of existing data residing in the higher performance/higher endurance solid state non-volatile media buffer section. At any given time, the memory controller may determine whether or not to trigger data eviction from the higher performance/higher endurance solid state non-volatile media buffer section based on the current vacancy (available free space) within the buffer space for the incoming LBA data, e.g., in order to maintain a minimum defined amount of available buffer space for writing new data to the buffer section. Once eviction is triggered, the memory controller may use a high frequency data threshold to determine what data to evict from the higher performance/higher endurance solid state non-volatile media buffer section when eviction occurs.

For example, assuming a selected predefined high frequency data threshold of greater than or equal to 3 standard deviations (3 sigma LBA update frequency distribution) of the monitored LBA update frequency values of all incoming LBA data written to the higher performance/higher endurance buffer section, the memory controller may select any existing data part (e.g., page) with less than 3 sigma LBA update frequency distribution as lower frequency LBA update data to form an evicted data block and evict (move) the selected data part to the evicted data block in the lower performance/lower endurance solid state non-volatile media. After this eviction, the evicted lower frequency LBA update data part resides in an evicted data block in the lower performance/lower endurance solid state non-volatile media without any invalidation of data in the evicted block and is therefore not involved in a "read-modify-write" operation. In a further embodiment, the memory controller may continue to monitor the amount of data residing in the higher performance/higher endurance solid state non-volatile media buffer section that meets or exceeds the high frequency data threshold (e.g., 3 sigma LBA update frequency distribution in this example). If the controller determines that the higher performance/higher endurance solid state non-volatile media buffer section is filled with data that meets or exceeds the high frequency data threshold, then the high frequency data threshold value may be lowered (e.g., to 2 sigma LBA update frequency distribution) and then the memory controller may select any additional existing data part (e.g., page) having less than the revised LBA update frequency distribution as new lower frequency LBA update data to form an evicted data block and evict (move) the additional selected data part to the evicted data block in the lower performance/lower endurance solid state non-volatile media. Once again, the evicted clustered data will have a higher chance of involving just an erase operation during a later garbage collection stage.

In one respect, disclosed herein is a memory device, including: high endurance solid state memory having a first program-erase (P/E) cycle endurance level; low endurance solid state memory having a second program-erase (P/E) cycle endurance level that is less than the first program-erase (P/E) cycle endurance level; and at least one programmable integrated circuit programmed to control writing of incoming data to the memory device by: writing all incoming data to data blocks in the high endurance solid state memory, invalidating existing data in the data blocks of the low endurance solid state memory and the high endurance solid state memory corresponding to a logical block address (LBA) as it is modified by the LBA of the incoming data, determining a LBA update frequency of the valid data in the data blocks of the high endurance solid state memory, identifying valid high frequency LBA update data in the data blocks of the high endurance solid state memory that has a LBA update frequency that is greater than a LBA update frequency of other high frequency LBA update data in the data blocks of the high endurance solid state memory, and migrating valid low frequency LBA update data to the data blocks of the low endurance solid state memory from data blocks of the high endurance solid state memory that also contain invalidated data, and not migrating any valid high frequency LBA update data from the data blocks of the high endurance solid state memory to the data blocks of the low endurance solid state memory.

In another respect, disclosed herein is an information handling system, including: a host programmable integrated circuit; a memory device coupled to receive incoming data from the host programmable integrated circuit, the memory device including: high endurance solid state memory having a first program-erase (P/E) cycle endurance level, low endurance solid state memory having a second program-erase (P/E) cycle endurance level that is less than the first program-erase (P/E) cycle endurance level, and at least one programmable integrated circuit. The at least one programmable integrated circuit of the memory device may be programmed to control writing of incoming data to the memory device by: writing all the incoming data to data blocks in the high endurance solid state memory, invalidating existing data in the data blocks of the low endurance solid state memory and the high endurance solid state memory corresponding to a logical block address (LBA) as it is modified by the LBA of the incoming data, determining a LBA update frequency of the valid data in the data blocks of the high endurance solid state memory, identifying valid high frequency LBA update data in the data blocks of the high endurance solid state memory that has a LBA update frequency that is greater than a LBA update frequency of other high frequency LBA update data in the data blocks of the high endurance solid state memory, and migrating valid low frequency LBA update data to the data blocks of the low endurance solid state memory from data blocks of the high endurance solid state memory that also contain invalidated data, and not migrating any valid high frequency LBA update data from the data blocks of the high endurance solid state memory to the data blocks of the low endurance solid state memory.

In another respect, disclosed herein is a method of operating a memory device including: receiving incoming data in a memory device from a host programmable integrated circuit, the memory device including: high endurance solid state memory having a first program-erase (P/E) cycle endurance level, and low endurance solid state memory having a second program-erase (P/E) cycle endurance level that is less than the first program-erase (P/E) cycle endurance level. The method may include controlling writing of the incoming data to the memory device by: writing all the incoming data to data blocks in the high endurance solid state memory, invalidating existing data in the data blocks of the low endurance solid state memory and the high endurance solid state memory corresponding to a logical block address (LBA) as it is modified by the LBA of the incoming data, determining a LBA update frequency of the valid data in the data blocks of the high endurance solid state memory, identifying valid high frequency LBA update data in the data blocks of the high endurance solid state memory that has a LBA update frequency that is greater than a LBA update frequency of other high frequency LBA update data in the data blocks of the high endurance solid state memory, and migrating valid low frequency LBA update data to the data blocks of the low endurance solid state memory from data blocks of the high endurance solid state memory that also contain invalidated data, and not migrating any valid high frequency LBA update data from the data blocks of the high endurance solid state memory to the data blocks of the low endurance solid state memory.

BRIEF DESCRIPTION OF THE DRAWINGS

FIG. 1 is a simplified representation of NAND flash memory media of a conventional memory device.

FIG. 2 is a simplified representation of NAND flash memory media of a conventional memory device.

FIG. 6 is a simplified representation of NAND flash memory media according to one exemplary embodiment of the disclosed methods and systems.

FIG. 7 is a simplified representation of NAND flash memory media according to one exemplary embodiment of the disclosed methods and systems.

DESCRIPTION OF ILLUSTRATIVE EMBODIMENTS

Figure 3:
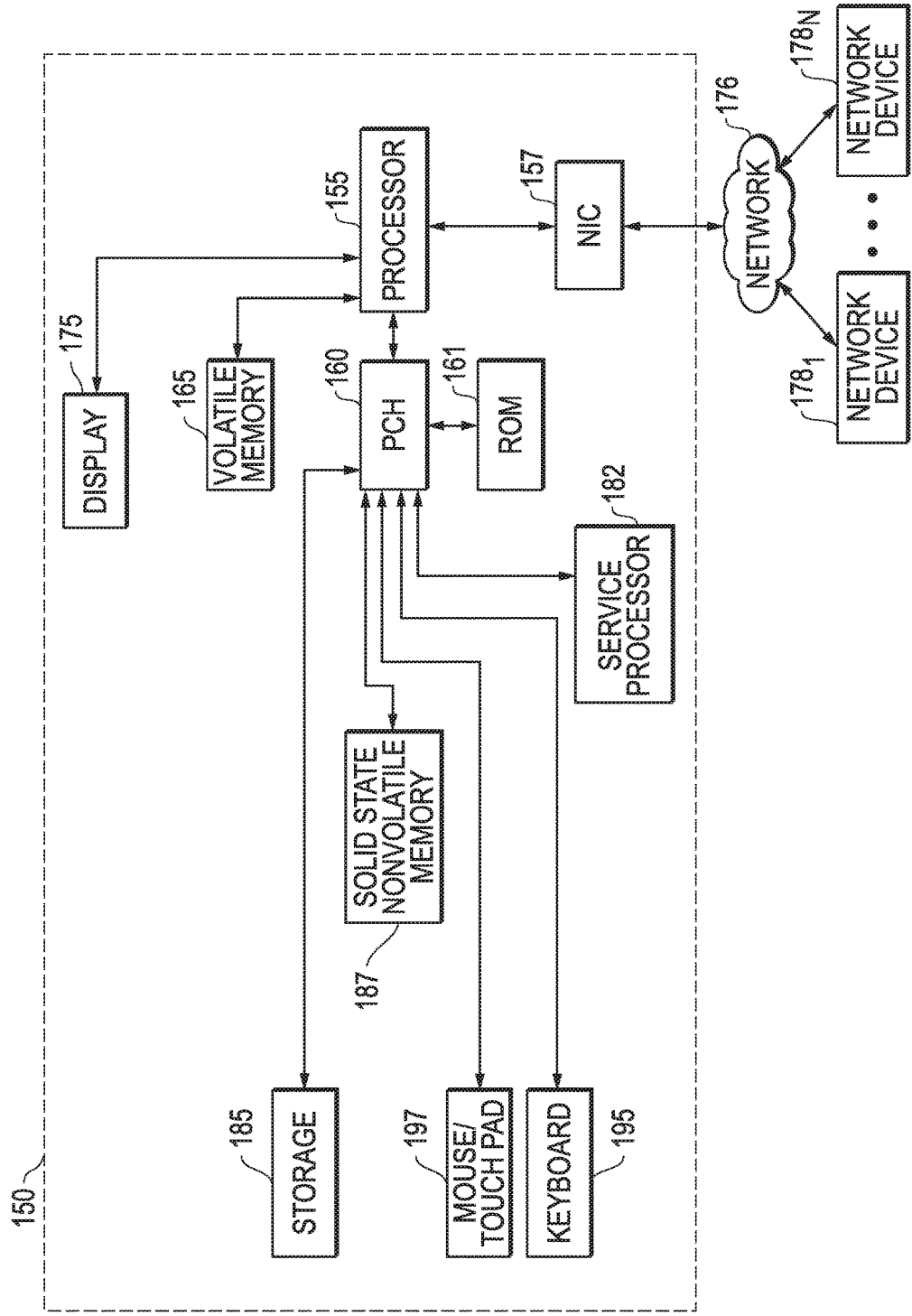
FIG. 3 illustrates a block diagram of an information handling system according to one exemplary embodiment of the disclosed methods and systems.

FIG. 3 is a block diagram of one embodiment of an information handling system 150 with which the disclosed methods and systems for data migration may be implemented. Information handling system 150 of FIG. 1 may be a computer server system, notebook computer system, convertible computer system, desktop computer system, computer workstation, etc. It will be understood that the system configuration of FIG. 1 is exemplary only, and that the disclosed systems and methods may be implemented to manage data migration for one or more solid state nonvolatile memory devices coupled in any other type of information handing system configuration including, but not limited to, cell phones or smart phones, tablet computers, set-top boxes, etc.

As shown in FIG. 3, information handling system 150 of this exemplary embodiment includes at least one host programmable integrated circuit 155, which may each be a central processing unit CPU (e.g., such as an Intel Pentium series processor, an Advanced Micro Devices (AMD) processor, etc.) or one of many other processors or other types of suitable processing devices configured to interpret and/or execute program instructions and/or process data. In some embodiments, programmable integrated circuit 155 may interpret and/or execute program instructions and/or process data stored in system volatile memory 165, solid state non-volatile memory, optional additional storage media 185 and/or another component of information handling system 150. System-powered volatile memory 165 (e.g., dynamic random access memory DRAM) may be coupled as shown to host programmable integrated circuit 155 via platform controller hub (PCH) 160 which facilitates input/output functions for the information handling system. System read only memory (ROM) 161 (e.g., such as erasable programmable read only memory "EPROM", electrically erasable programmable read only memory "EEPROM", etc.) is also provided as shown for storing start up firmware, such as system BIOS. Also shown coupled to host programmable integrated circuit 155 is network interface card (NIC) 157 that is provided to enable communication across network 176 (e.g., such as the Internet or local corporate intranet) with various multiple information handling systems configured as network devices $178_1$-$178_N$.

Still referring to FIG. 3, solid state non-volatile memory device 187 may in one embodiment be an internal or external solid state drive (SSD) coupled to PCH 160, and that includes NAND Flash memory and a memory controller to provide storage for the information handling system. As shown, optional additional storage 185 (e.g., hard drive, optical drive, etc.) may also be coupled to PCH 160 to provide additional storage for information handling system 150. One or more input devices (e.g., keyboard 195, mouse/touchpad 197, etc.) may be optionally coupled to PCH 160 and its controller chip to enable the user to interact with the information handling system 150 and programs or other software/firmware executing thereon. A display device 175 (e.g., LED display, touchscreen display, etc.) may be coupled as shown to an integrated graphics processing unit (iGPU) of host programmable integrated circuit 155 for display of information to a user. As further shown, the exemplary information handling system 150 of this embodiment may also include an optional service processor 182 suitable for the given configuration of information handling system 150 (e.g., such as embedded controller, baseboard management controller "BMC", etc.) and that is coupled to PCH 160 and its controller chip as shown. It will be understood that the particular combination of information handling system components of FIG. 1 is exemplary only, and that the disclosed methods and systems may be implemented with an information handling system that includes any other suitable combination of additional, fewer or alternative information handling system components (e.g., including one or more programmable integrated circuits).

In the embodiment of FIG. 3, PCH 160 may be coupled to other components with optional interfaces such as a PCIe interface and device interfaces such as a USB (Universal Serial Bus) interface, for example. It will be understood that solid state non-volatile memory device 187 may be configured as an integral component within a chassis of information handling system 150 (e.g., internal SDD), or may be alternatively configured as an attached external storage device.

Figure 4:
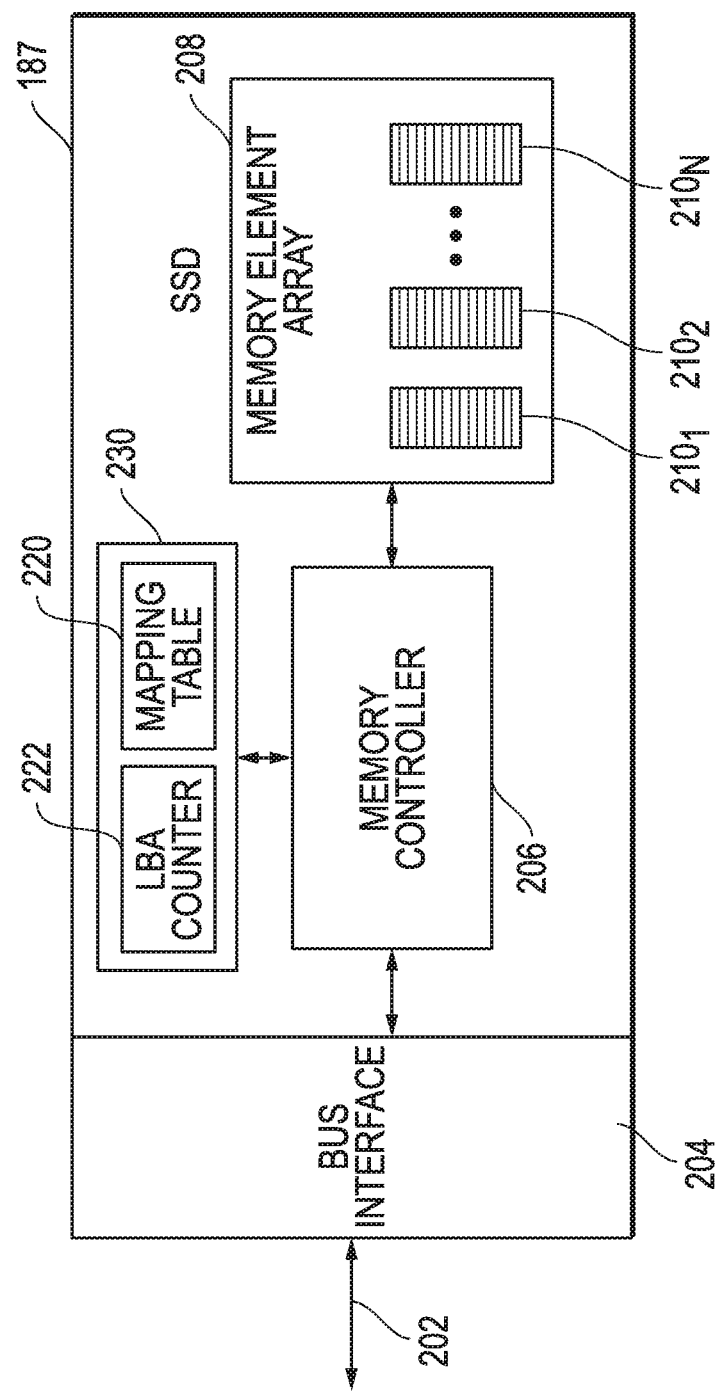
FIG. 4 illustrates a bock diagram of one exemplary embodiment of solid state nonvolatile memory device according to one exemplary embodiment of the disclosed methods and systems.

FIG. 4 illustrates a bock diagram of one exemplary embodiment of solid state nonvolatile memory device 187 that is configured as a solid state drive (SDD) to store information during operation of information handling system 150. In the embodiment of FIG. 4, nonvolatile memory device 187 includes an array 208 of nonvolatile memory (e.g., Flash) memory elements (e.g., flash memory chips) $210_1$ to $210_N$ to which data is written to and read back by host programmable integrated circuit 155 across data bus 202 (e.g., high speed PCIe 3.0 bus or other suitable data bus such as serial advanced technology attachment "SATA", serial attached SCSI "SAS", etc.) via bus interface 204. As shown, a nonvolatile memory (e.g., Flash) controller 206 (e.g., any suitable programmable integrated circuit such as microprocessor, microcontroller, ASIC, FPGA, etc.) coupled to controller memory 230 (e.g., non-volatile flash memory) that stores a mapping table 220 that may be used by controller 206 to control reads to and writes from the memory elements 210 of array 208 as well an LBA counter 222 that may be used together with mapping table 220 to manage migration (e.g., eviction) of data from an input data buffer section to a main memory section of the NAND memory device as will be described further herein.

In one embodiment, controller 206 may reference mapping table 220 in performing reads and writes in order to translate virtual logical block addresses (LBAs) of nonvolatile memory device 187 (as "seen" by host programmable integrated circuit 155) to physical block addresses of flash memory elements 210 of flash array 208. Further information on possible components and operation of an information handing system and/or nonvolatile memory device such as device 187 may be found in U.S. Pat. Nos. 8,239,618; 8,671,241; and 8,266,354, each of which is incorporated herein by reference in its entirety for all purposes.

Figure 5:
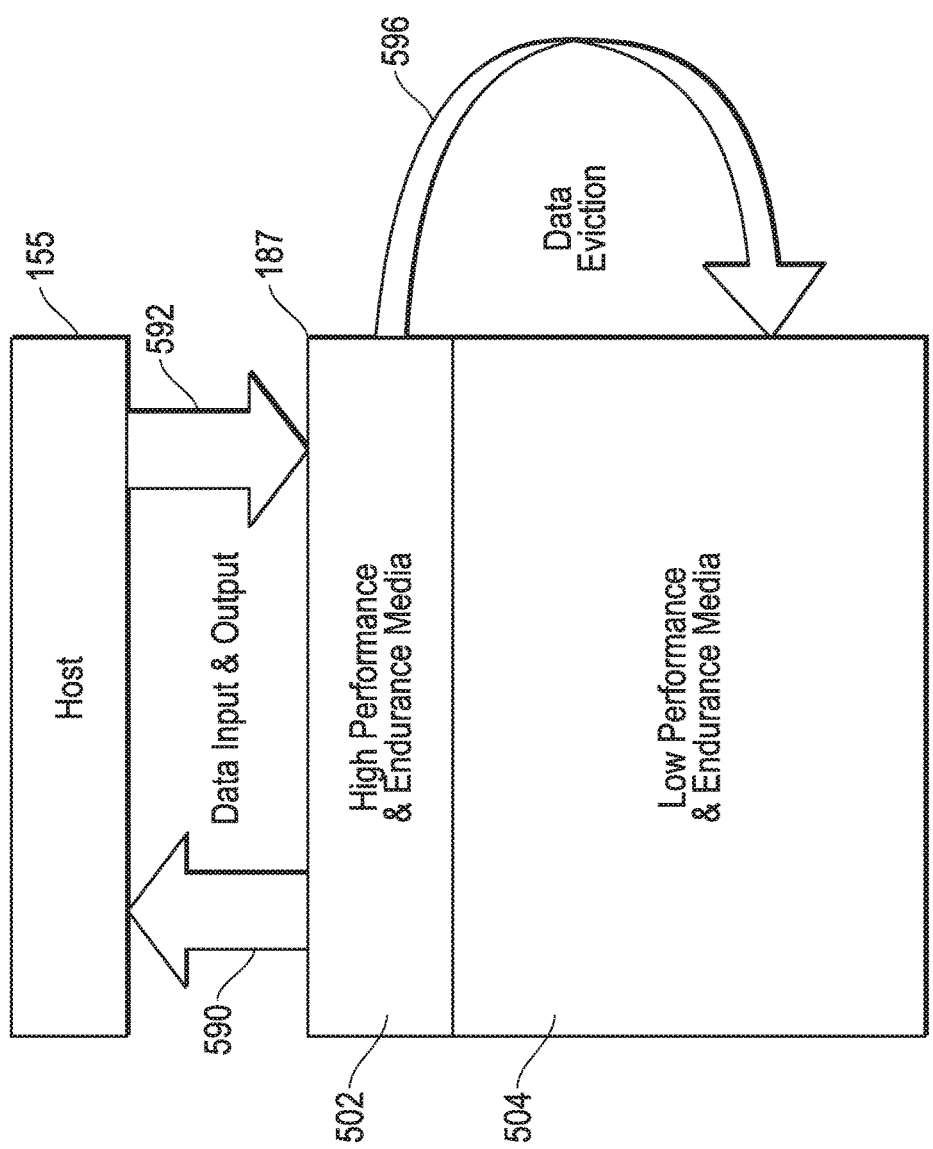
FIG. 5 illustrates a data migration operation within a solid state nonvolatile memory device according to one exemplary embodiment of the disclosed methods and systems.

FIG. 5 illustrates a block diagram showing data migration operation of solid state nonvolatile memory device 187 relative to host programmable integrated circuit 155. As shown in FIG. 5, host programmable integrated circuit 155 provides LBA input data 592 for writing to memory device 187, and receives LBA output data 590 that is read from memory device 187. As shown, LBA input data 592 is provided under the control of memory controller 206 to higher performance/higher endurance solid state non-volatile media of input buffer section 502 of memory device 182 that is positioned in the data-receiving front of memory device 187. As described further herein, memory controller 206 of memory device 187 may monitor and track (e.g., record in LBA counter 222) the LBA data update frequency of existing data written to input buffer section 502. In this regard, the LBA data update frequency dynamically changes depending on the accumulated access counts. Depending on the time of eviction, the memory controller 206 of memory device 187 may normalize the distributed frequency and select the high frequency data threshold, e.g., as a selected sigma value of the distribution.

and may use a selected high frequency data threshold to determine when to trigger data eviction 596 of low frequency LBA update data (e.g., LBA data that is updated for writing at a frequency less than about 3 sigma distributed frequency) from the higher performance/higher endurance solid state non-volatile media input buffer section 502 to the lower performance/lower endurance solid state non-volatile media of main memory section 504. In one exemplary embodiment, this data eviction may occur such that high frequency LBA update data (e.g., LBA data that is updated for writing at a frequency greater than or equal to about 3 sigma distributed frequency) is left residing in higher performance/higher endurance solid state non-volatile media of input buffer section 502. One example of low frequency LBA update data is a video file (e.g., movie or clip) that is written only once, but that may be read by a user many times. Examples of high frequency LBA update data include an operations system (OS) file rewritten (saved) by system OS with high frequency, or a spreadsheet file or word processing document that may be rewritten (saved) by a user many times during data entry or document drafting. Only the high frequency LBA update data contributes significantly to write amplification.

It will be understood that the higher performance/higher endurance solid state non-volatile media of input buffer section 502 may be any solid state non-volatile media having a write performance (e.g., measured by programming time in microseconds) that is relatively higher than the write performance of lower performance/lower endurance solid state non-volatile media of main memory section 504, and having an endurance (e.g., measured in cumulative total possible P/E cycles) that is relatively higher than the endurance of lower performance/lower endurance solid state non-volatile media of main memory section 504. For example, the higher performance/higher endurance solid state non-volatile media of input buffer section 502 may be SLC NAND flash memory having 200 to 300 microsecond programming time and an endurance level of greater than or equal to about 30,000 (e.g., 30,000 to 100,000) cumulative total P/E cycles, and the lower performance/lower endurance solid state non-volatile media of main memory section 504 may be QLC NAND flash memory having greater than 1500 microsecond programming time and an endurance level of less than or equal to about 300 (e.g., 100 to 300) cumulative total P/E cycles.

In this regard, a P/E cycle is a sequence in which data is written to the solid-state non-volatile memory media, then erased from the media, and then rewritten to the media. It will be understood that the above example ranges of cumulative P/E cycles are exemplary only, and that a higher performance/higher endurance solid state non-volatile media may have any performance level value that is greater than the performance level value of the lower performance/lower endurance solid state non-volatile media, and that the higher performance/higher endurance solid state non-volatile media may have any endurance level value that is greater than the endurance level value of the lower performance/lower endurance solid state non-volatile media endurance level value. Table 1 below provides exemplary performance and endurance levels for four different types of solid state NAND flash memory, with any listed given type of solid state NAND flash memory being characterized as a higher performance/higher endurance solid state non-volatile media type relative to any other type of solid state NAND flash memory that is listed in a column to its right in Table 1, it being understood that other types of solid state memory media may be employed including solid state memory media storing 5 or more bits per cell.

TABLE 1

|  | SLC | MLC | TLC | QLC |
| --- | --- | --- | --- | --- |
| Bits/Cell | 1 | 2 | 3 | 4 |
| P/E Cycles | 30,000-100,000 | 3000 | 1000-1500 | 100-300 |
| Read Time | 25 µs | 50 µs | 75 µs | >100 µs |
| Program | 200-300 µs | 600-900 µs | 900-1350 µs | >1500 µs |
| Erase Time | 1.5-2 ms | 3 ms | 5 ms | >6 ms |

FIG. 6 is a simplified representation of one exemplary embodiment of the solid state non-volatile media (e.g., NAND flash memory array 208) of a solid state non-volatile memory device 187 such as illustrated and described in relation to FIGS. 3 and 4. As shown in FIG. 6, solid state non-volatile media of memory device 187 includes an input buffer section 602 of higher performance/higher endurance solid state memory media (e.g., SLC NAND flash media) and a main memory section 604 of solid state memory media (e.g., QLC NAND flash media). In the embodiment of FIG. 6, memory media for input buffer section 602 and main memory section 604 may be each be formed by a number and type of nonvolatile memory elements 210 that correspond to the selected size and performance/endurance of the respected section 602 or 604. For example, as shown in FIG. 6, input buffer section 602 is smaller in capacity than main memory section 604. In this regard, relative size difference between input buffer section 602 and main memory section 604 may varied as desired to fit a given application, but in one embodiment data capacity of input buffer section 602 may be about one third the data capacity of main memory section 604, although in other embodiments data capacity of input buffer section 602 may be less than one third the data capacity of main memory section 604 or may be greater than the data capacity of main memory section 604.

Still referring to FIG. 6, solid state non-volatile memory device 187 is shown in a condition that exists just before receiving an incoming input/output (I/O) operation 702 that is discussed further with regard to FIG. 7. In FIG. 6, input buffer section 602 includes multiple memory blocks 610*a* to 610*c* that each contain parts (e.g., pages) of valid (non-hashed) and invalid (hashed) data. In this case, memory block 610*a* includes four parts of high frequency LBA update data that have all been invalidated, memory block 610*b* includes two parts of invalid high frequency LBA update data and two parts of valid low frequency LBA update data, and memory block 610*c* includes two parts of invalid high frequency LBA update data and two parts of valid high frequency LBA update data. As shown, the two valid (non-hashed) data parts of memory block 610*c* may contain high frequency LBA update data #1 and #2 that has replaced previously existing high frequency update LBA data #1 and #2 of various other, now invalidated, data parts contained in memory blocks 610*a*, 610*b* and 610*c* as shown. When an existing part of LBA data is invalidated in a given data block 610 and replaced by a modified version of the same LBA data that is written to a different data block 610, the new physical block address of the modified LBA data is updated in mapping table 220. Since high frequency LBA update data is written to memory device 600 more often, buffer 602 may at any time contain more invalidated parts of high frequency LBA update data than parts of invalidated low frequency LBA update data. It will be understood that the number of memory blocks and memory parts illustrated in FIGS. 6 and 7 are exemplary only, and that the number of memory blocks may be greater or less than illustrated, and that the number of data parts (e.g., pages) contained in a given memory block may be greater or less then illustrated.

Figure 8:
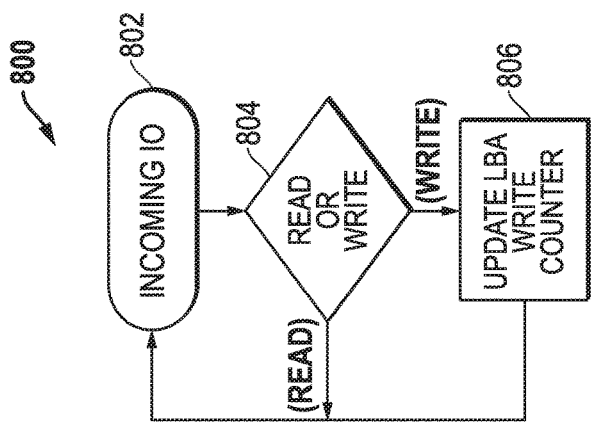
FIG. 8 illustrates methodology according to one exemplary embodiment of the disclosed methods and systems.

Moreover, memory controller 206 of memory device 187 may be programmed to monitor frequency of I/O write operations to input buffer section 602 in real time so that it is aware of which data parts contain high frequency LBA update data and which data parts contain low frequency LBA update data, and so that it may retain all high frequency LBA update data in input buffered section 602 while it evicts only valid low frequency LBA update data to main memory section 604 as described further herein. FIG. 8 illustrates one exemplary embodiment of methodology 800 that may be implemented by memory controller 206 to so monitor and track frequency of all incoming I/O write operations to input buffer section 602. As shown, methodology 800 begins in step 802 with receipt of incoming LBA read or write I/O. If the current incoming I/O is an LBA read operation, then methodology returns to step 802 and waits for the next incoming LBA I/O operation. However, if the current incoming I/O is found to be an LBA write operation corresponding to a given LBA in step 804, then methodology 800 proceeds to step 806 where it updates (e.g., increments) the cumulative write total for the given LBA in LBA counter 222 to reflect the new write operation for that given LBA. In this way, each different given LBA has a cumulative write total that may in one embodiment be updated in real time by memory controller 206 so that the relative LBA update frequency for each LBA may be tracked in real time and maintained in LBA counter 222.

Returning to FIG. 6, a garbage collection cycle may be triggered by amount of remaining free space in the the buffer section 602 and controlled by memory controller 206. When initiated, a garbage collection cycle may begin by collecting, aggregating, and writing only valid low frequency LBA update data from parts of the various memory blocks 610*a* to 610*c* of input buffer section 602 to new SSD memory locations in main memory section 604 as shown. Any high frequency LBA update data is not moved from buffer section 602 to main memory section 604. As described further in relation to FIG. 9, memory controller may use tracked data in LBA update counter 222 to distinguish between low frequency LBA update data and high frequency LBA update data, and may use mapping table 220 to determine the physical block addresses of each high frequency LBA update data part and each low frequency LBA update data part in the memory media of both input buffer section 602 and the main memory section 604.

Figure 9:
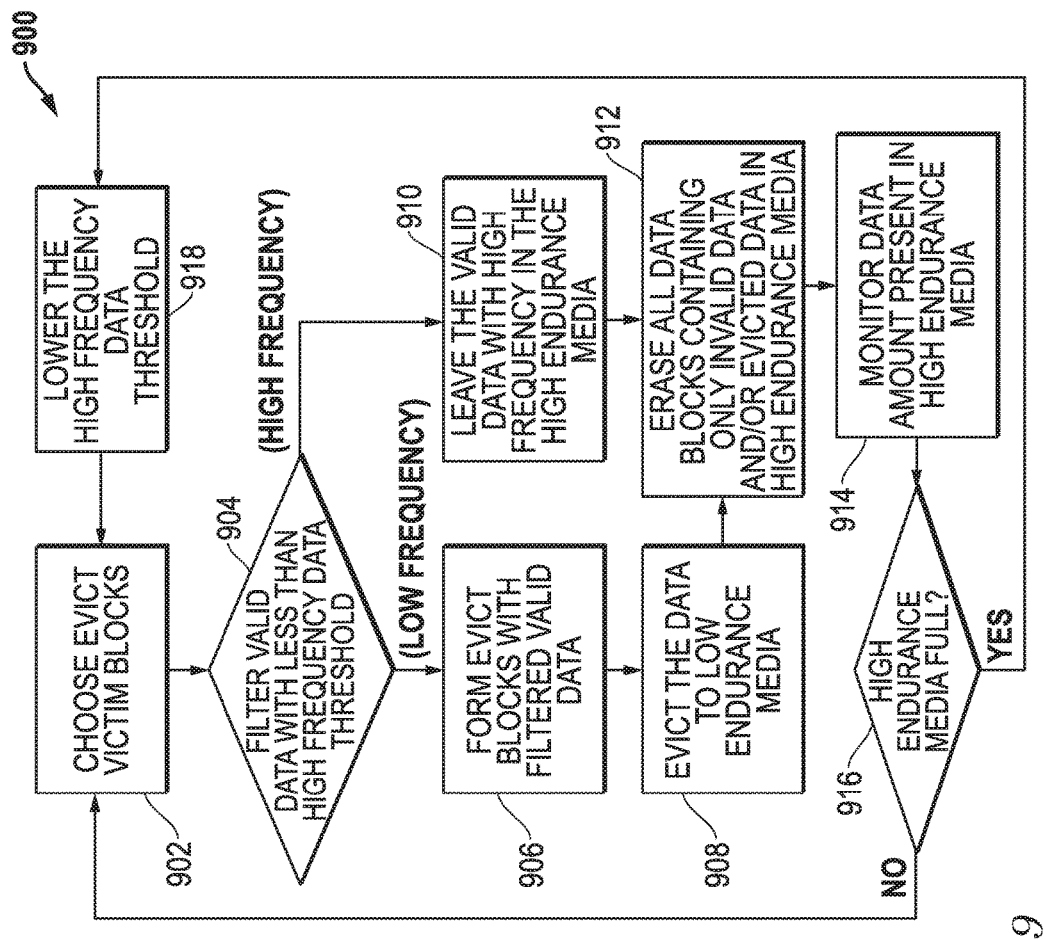
FIG. 9 illustrates methodology according to one exemplary embodiment of the disclosed methods and systems.

FIG. 9 illustrates one exemplary embodiment of methodology 900 that may be implemented by memory controller 206 to perform garbage collection, e.g., for data such as illustrated in FIG. 6. Methodology 900 may either be performed in real time as new I/Os 702 are received from host 155, or may alternatively only be performed when the host programmable integrated circuit is idle or during system idle time (e.g., such as during start of system shut-down or stand-by) so as to reduce impact on read/write performance (e.g., speed) of memory device 187 that is seen by a user who is reading data from, and writing data to the memory device 187. Methodology 900 starts in step 902 where memory controller identifies all data blocks 610 in input buffer 602 that contain valid data together with a threshold amount of invalid data, e.g., such as data block 610*b* of FIG. 6. Each of such identified data blocks is chosen as a "victim" data block for potential eviction from the input buffered section 602 to the main memory section 604. Next, in step 904, memory controller 206 applies a predefined high frequency data threshold (e.g., such as 3 sigma LBA update frequency distribution) to filter out all valid data (e.g., pages) having an LBA update frequency distribution that is greater than or equal to 3 sigma LBA update frequency distribution so that only valid data parts (e.g., pages) having a LBA update frequency distribution that is less than 3 sigma LBA update frequency distribution are classified as low frequency LBA update data for eviction to lower performance/lower endurance memory media of main memory section 604, while all valid data parts (e.g., pages) having a LBA update frequency distribution that is greater than or equal to 3 sigma LBA update frequency distribution are classified as high frequency LBA update data for retention in higher performance/higher endurance memory media of input buffer section 602.

Next, in step 906, all identified valid low frequency LBA update data (e.g., such as low frequency LBA update data parts #1 and #2 of memory block 610*b* of FIG. 6) are aggregated together to form evict one or more evict data blocks in step 906, and then moved (evicted) together in step 908 to one or more respective memory blocks of lower performance/lower endurance memory media of main memory section 604 (e.g., such as low frequency LBA update data parts #1 and #2 moved from memory block 610*b* to memory block 612 as shown in FIG. 6). However, any valid high frequency LBA update data that is identified in step 904 (e.g., such as high frequency LBA update data parts #1 and #2 of memory block 610c of FIG. 6) is left (retained) in higher performance/higher endurance memory media of input buffer section 602. Following steps 908 and 910, all data blocks 610 that contain no valid data (i.e., they contain only invalid and/or evicted data) are erased from higher performance/higher endurance memory media of input buffer section 602 (e.g., such as data blocks 610a and 610b of FIG. 6). This creates space to allow new incoming LBA data to be written to buffer section 602 as shown in FIG. 7.

As shown in FIG. 9, methodology 900 may also include optional steps 914 to 918 that may be performed prior to returning to step 902 to repeat methodology 900. In optional step 914, memory controller 206 may monitor and determine the amount of data retained in input buffer section 602 after data eviction and data erasure of step 912. Next, in step 916 memory controller 206 may determine if higher performance/higher endurance memory media of input buffer section 602 is filled with the determined amount of data from step 914 fills input buffer section 602. If not, then methodology 900 returns to step 902 and methodology 900 repeats. However, if it is determined in step 916 that the determined amount of data from step 914 fills input buffer section 602, then methodology 900 may proceed to step 918 where the high frequency data threshold value may be lowered by a predefined incremental amount (e.g., lowered by 1 sigma LBA update frequency distribution so as to result in a new 2 sigma LBA update frequency distribution) before returning to step 902 and repeating.

FIG. 7 illustrates solid state non-volatile memory device 187 of FIG. 6 after garbage collection methodology 900 has been performed. As shown in FIG. 7, data from data block 610c of FIG. 6 was not evicted from input buffer section 602 by the last iteration of methodology 900 because data block 610c contained valid high frequency LBA update data parts #1 and #2, and since methodology 900 does not evict any valid high frequency LBA update data parts. And since all data parts of a data block must be erased at once, methodology 900 does not erase any data blocks 610 containing any valid high frequency LBA update data parts from input buffer section 602 until all data parts in a data block 610 are invalidated. However, in FIG. 7 new incoming high frequency LBA update data parts #1 and #2 are subsequently written by incoming I/O 702 from host 155 via memory controller 206 to two data parts of memory block 610a, which then causes memory controller 206 to invalidate corresponding existing high frequency LBA update data parts #1 and #2 of memory block 610c of input buffer section 602 as indicated by the check marks in FIG. 7. Only at this time is data block 610c erased from higher performance/higher endurance media of input buffer section 602 during performance of the next iteration of step 912 of methodology 900, i.e., since data block 610c now contains only invalid data.

Because now-invalidated high frequency LBA update data parts #1 and #2 are maintained in memory block 610c of higher performance/higher endurance media of input buffer section 602, the valid low frequency LBA update data parts #1 and #2 of data block 612 are not required to be read and rewritten to a new data block within lower performance/lower endurance media of main section 604 due to invalidation of high frequency LBA update data parts #1 and #2 during the next garbage collection cycle. Rather, valid low frequency LBA update data parts #1 and #2 of data block 612 are not re-written or erased upon receipt of new incoming high frequency LBA update data parts #1 and #2 to input data section 602, and therefore P/E cycles and write amplification within lower performance/lower endurance media of main section 604 are reduced compared to conventional NAND memory technology of FIGS. 1 and 2. Thus, in one embodiment the disclosed systems and methods may be implemented to never write, evict or otherwise move high frequency LBA update data from input buffer section 602 to lower performance/lower endurance media of main section 604, but rather to always keep all high frequency LBA update data in higher performance/higher endurance media of input buffer section 602. In such an embodiment, only low frequency LBA update data is written and stored in lower performance/lower endurance media of main section 604, which reduces the P/E cycles and wear to the lower performance/lower endurance media of main section 604, and extends its useful life.

Figure 10:
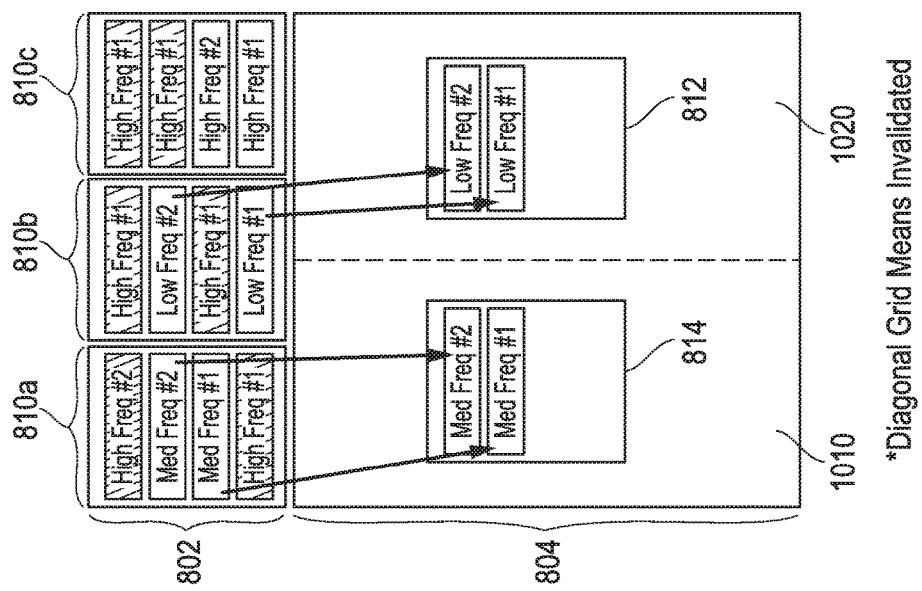
FIG. 10 is a simplified representation of NAND flash memory media according to one exemplary embodiment of the disclosed methods and systems.

FIG. 10 is a simplified representation of another exemplary embodiment of the solid state non-volatile media (e.g., NAND flash memory array 208) of a solid state non-volatile memory device 187 such as illustrated and described in relation to FIGS. 3 and 4. In this embodiment, solid state non-volatile media of memory device 187 includes an input buffer section 802 of higher performance/higher endurance solid state memory media (e.g., SLC NAND flash media) and a main memory section 804 of solid state memory media (e.g., QLC NAND flash media) configured similarly to that illustrated in FIG. 6. However, in the embodiment of FIG. 9, memory block 810a includes two parts (e.g., pages) of high frequency LBA update data that have all been invalidated, as well as two parts (e.g., pages) of valid medium frequency LBA update data. Memory block 810b includes two parts of invalid high frequency LBA update data and two parts of valid low frequency LBA update data, and memory block 810c includes two parts of invalid high frequency LBA update data and two parts of valid high frequency LBA update data.

In one embodiment of FIG. 10, memory controller 206 may be configured to use the LBA write count values from LBA write counter 222 together with multiple LBA update frequency threshold values to classify data stored in the solid state non-volatile media of a solid state non-volatile memory device 187 into more than two different LBA update frequency ranges. For example, a predefined high frequency data threshold (e.g., such as 3 sigma distributed frequency LBA update frequency distribution) may be used by memory controller 206 to classify all valid data (e.g., pages) having an LBA update frequency distribution that is greater than or equal to predefined high frequency data threshold as high frequency LBA update data, while a predefined medium frequency data threshold (e.g., such as 2 sigma distributed frequency LBA update frequency distribution) may be used by memory controller 206 to classify all valid data (e.g., pages) having an LBA update frequency distribution that is greater than or equal to the predefined medium frequency data threshold and less than the predefined high frequency data threshold as medium frequency LBA update data, with all valid data (e.g., pages) having an LBA update frequency distribution that is less than the predefined medium frequency data threshold as low frequency LBA update data.

Using the above-described methodology, only valid data parts (e.g., pages) having a LBA update frequency distribution that is less than the predefined high frequency data threshold are evicted to lower performance/lower endurance memory media of main memory section 604, while all valid data parts (e.g., pages) having a LBA update frequency distribution that is greater than or equal to the predefined high frequency data threshold are retained as shown as high frequency LBA update data in higher performance/higher endurance memory media of input buffer section 602. However, in this embodiment, evicted valid medium frequency LBA update data parts are written to a data block 814 that is different from a data block 812 that contains the evicted low frequency LBA update data parts, as illustrated by the arrows in FIG. 10. In this way, data having multiple different LBA update frequency ranges may be evicted and written to different designated portions (e.g., data block/s in medium frequency portion 1010 and low frequency portion 1020 of FIG. 10) of lower performance/lower endurance media of main memory section 804 to further reduce the number of P/E cycles (and the incurred cumulative wear caused by P/E cycles) for the designated portions of lower performance/lower endurance media of main memory section 804 that contained the lowest (e.g., "low") frequency LBA update data parts as compared to all other portions of lower performance/lower endurance media of main memory section 804.

It will be understood that the steps of methodologies 800 and 900 described herein are exemplary only, and that any other sequence or combination of additional, fewer and/or alternative steps may be employed that is suitable for managing data migration for solid state non-volatile memory in a manner as described herein.

It will also be understood that one or more of the tasks, functions, or methodologies described herein for an information handling system or component thereof (e.g., including those described herein for components 155, 182, 206, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such programmable integrated circuits may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein. It will also be understood that one or more steps of the present methodologies may be employed in one or more code segments of the computer program. For example, a code segment executed by the information handling system may include one or more steps of the disclosed methodologies. It will be understood that a programmable integrated circuit may be configured to execute or otherwise be programmed with software, firmware, logic, and/or other program instructions stored in one or more non-transitory tangible computer-readable mediums (e.g., example, data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random update memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A memory device, comprising:
   high endurance solid state memory having a first program-erase (P/E) cycle endurance level;
   low endurance solid state memory having a second program-erase (P/E) cycle endurance level that is less than the first program-erase (P/E) cycle endurance level;
   at least one programmable integrated circuit programmed to control writing of incoming data to the memory device by:
     writing all incoming data to data blocks in the high endurance solid state memory,
     invalidating existing data in the data blocks of the low endurance solid state memory and the high endurance solid state memory corresponding to a logical block address (LBA) as it is modified by the LBA of the incoming data,
     determining a LBA update frequency of the valid data in the data blocks of the high endurance solid state memory,
     identifying valid high frequency LBA update data in the data blocks of the high endurance solid state memory that has a LBA update frequency that is greater than a LBA update frequency of other high frequency LBA update data in the data blocks of the high endurance solid state memory, and
     migrating valid low frequency LBA update data to the data blocks of the low endurance solid state memory from data blocks of the high endurance solid state memory that also contain invalidated data, and not migrating any valid high frequency LBA update data from the data blocks of the high endurance solid state memory to the data blocks of the low endurance solid state memory.

2. The memory device of claim 1, further comprising non-volatile memory coupled to the at least one programmable integrated circuit for storing a mapping table and LBA write counter data; where the the at least one programmable integrated circuit is programmed to access the mapping table to determine physical block addresses in the high endurance solid state memory corresponding to a LBA of the incoming data; and to determining a LBA update frequency of the valid data in the data blocks of the high endurance solid state memory in real time by incrementing a counter in the LBA write counter data corresponding to the LBA of the incoming data.

3. The memory device of claim 1, where the at least one programmable integrated circuit is further programmed to perform the step of migrating so as to evict the valid low frequency LBA update data to the data blocks of the low endurance solid state memory as part of a garbage collection operation for the memory device; and to:
select valid low frequency LBA update data for eviction only from data blocks of the high endurance solid state memory that include more than a defined threshold level amount of invalid data; and
erase any given data block of the high endurance solid state memory only after all data in the given data block has been invalidated.

4. The memory device of claim 1, where the at least one programmable integrated circuit is further programmed to identify the high frequency LBA update data as valid data blocks of the high endurance solid state memory having a LBA update frequency that is greater than or equal to a defined high frequency data threshold value; and to to identify the low frequency LBA update data as valid data blocks of the high endurance solid state memory having a LBA update frequency that is less than the defined high frequency data threshold.

5. The memory device of claim 4, where the at least one programmable integrated circuit is further programmed to monitor the amount of high frequency LBA update data contained in the the high endurance solid state memory; and to:
lower the defined high frequency data threshold value when the monitored amount of high frequency LBA update data fills the high endurance solid state memory so as to reduce the amount of high frequency LBA update data contained in the the high endurance solid state memory; and
leave the defined high frequency data threshold value unchanged when the monitored amount of high frequency LBA update data does not fill the high endurance solid state memory.

6. The memory device of claim 1, where the at least one programmable integrated circuit is further programmed to:
identify valid medium frequency LBA update data in the data blocks of the high endurance solid state memory that has a LBA update frequency that is less than a LBA update frequency of the high frequency LBA update data and that is greater than a LBA update frequency of the low frequency LBA update data;
migrating the valid low frequency LBA update data from data blocks of the high endurance solid state memory only to a designated low frequency portion of the low endurance solid state memory media; and migrating the valid medium frequency LBA update data from data blocks of the high endurance solid state memory only to a designated medium frequency portion of the low endurance solid state memory media that is a different portion of the the low endurance solid state memory media from the designated low frequency portion of the low endurance solid state memory media;
where the at least one programmable integrated circuit is further programmed to never migrate the valid low frequency LBA update data from data blocks of the high endurance solid state memory to the designated medium frequency portion of the low endurance solid state memory media, and to never migrate the valid medium frequency LBA update data from data blocks of the high endurance solid state memory to the designated low frequency portion of the low endurance solid state memory media.

7. The memory device of claim 1, where the high endurance solid state memory is single-level cell (SLC) NAND flash media having a single bit per cell; and where the low endurance solid state memory is at least one of multi-level cell (MLC) memory having two bits per cell, triple-level cell (TLC) memory having three bits per cell, or quad-level cell (QLC) memory having four bits per cell.

8. An information handling system, comprising:
a host programmable integrated circuit;
a memory device coupled to receive incoming data from the host programmable integrated circuit, the memory device comprising:
high endurance solid state memory having a first program-erase (P/E) cycle endurance level,
low endurance solid state memory having a second program-erase (P/E) cycle endurance level that is less than the first program-erase (P/E) cycle endurance level, and
at least one programmable integrated circuit;
where the at least one programmable integrated circuit of the memory device is programmed to control writing of incoming data to the memory device by:
writing all the incoming data to data blocks in the high endurance solid state memory,
invalidating existing data in the data blocks of the low endurance solid state memory and the high endurance solid state memory corresponding to a logical block address (LBA) as it is modified by the LBA of the incoming data,
determining a LBA update frequency of valid data in the data blocks of the high endurance solid state memory,
identifying valid high frequency LBA update data in the data blocks of the high endurance solid state memory that has a LBA update frequency that is greater than a LBA update frequency of other high frequency LBA update data in the data blocks of the high endurance solid state memory, and
migrating valid low frequency LBA update data to the data blocks of the low endurance solid state memory from data blocks of the high endurance solid state memory that also contain invalidated data, and not migrating any valid high frequency LBA update data from the data blocks of the high endurance solid state memory to the data blocks of the low endurance solid state memory.

9. The system of claim 8, where the memory device further comprises non-volatile memory coupled to the at least one programmable integrated circuit of the memory device for storing a mapping table and LBA write counter data; where the the at least one programmable integrated circuit of the memory device is programmed to access the mapping table to determine physical block addresses in the high endurance solid state memory corresponding to a LBA of the incoming data, and to determining a LBA update frequency of the valid data in the data blocks of the high endurance solid state memory in real time by incrementing a counter in the LBA write counter data corresponding to the LBA of the incoming data.

10. The system of claim 8, where the at least one programmable integrated circuit of the memory device is further programmed to perform the step of migrating so as to evict the valid low frequency LBA update data to the data blocks of the low endurance solid state memory as part of a garbage collection operation for the memory device; and to:
select valid low frequency LBA update data for eviction only from data blocks of the high endurance solid state memory that include more than a defined threshold level amount of invalid data; and
erase any given data block of the high endurance solid state memory only after all data in the given data block has been invalidated.

11. The system of claim 8, where the at least one programmable integrated circuit of the memory device is further programmed to identify the high frequency LBA update data as valid data blocks of the high endurance solid state memory having a LBA update frequency that is greater than or equal to a defined high frequency data threshold value; and to to identify the low frequency LBA update data as valid data blocks of the high endurance solid state memory having a LBA update frequency that is less than the defined high frequency data threshold.

12. The system of claim 8, where the at least one programmable integrated circuit of the memory device is further programmed to:
identify valid medium frequency LBA update data in the data blocks of the high endurance solid state memory that has a LBA update frequency that is less than a LBA update frequency of the high frequency LBA update data and that is greater than a LBA update frequency of the low frequency LBA update data;
migrating the valid low frequency LBA update data from data blocks of the high endurance solid state memory only to a designated low frequency portion of the low endurance solid state memory media; and
migrating the valid medium frequency LBA update data from data blocks of the high endurance solid state memory only to a designated medium frequency portion of the low endurance solid state memory media that is a different portion of the the low endurance solid state memory media from the designated low frequency portion of the low endurance solid state memory media;
where the at least one programmable integrated circuit is further programmed to never migrate the valid low frequency LBA update data from data blocks of the high endurance solid state memory to the designated medium frequency portion of the low endurance solid state memory media, and to never migrate the valid medium frequency LBA update data from data blocks of the high endurance solid state memory to the designated low frequency portion of the low endurance solid state memory media.

13. The system of claim 8, where the at least one programmable integrated circuit is further programmed to migrate the valid low frequency LBA update data to the data blocks of the low endurance solid state memory from data blocks of the high endurance solid state memory only while the host programmable integrated circuit is idle or during system idle time.

14. A method of operating a memory device comprising:
receiving incoming data in a memory device from a host programmable integrated circuit, the memory device comprising:
high endurance solid state memory having a first program-erase (P/E) cycle endurance level, and
low endurance solid state memory having a second program-erase (P/E) cycle endurance level that is less than the first program-erase (P/E) cycle endurance level; and
controlling writing of the incoming data to the memory device by:
writing all the incoming data to data blocks in the high endurance solid state memory,
invalidating existing data in the data blocks of the low endurance solid state memory and the high endurance solid state memory corresponding to a logical block address (LBA) as it is modified by the LBA of the incoming data,
determining a LBA update frequency of the valid data in the data blocks of the high endurance solid state memory,
identifying valid high frequency LBA update data in the data blocks of the high endurance solid state memory that has a LBA update frequency that is greater than a LBA update frequency of other high frequency LBA update data in the data blocks of the high endurance solid state memory, and
migrating valid low frequency LBA update data to the data blocks of the low endurance solid state memory from data blocks of the high endurance solid state memory that also contain invalidated data, and not migrating any valid high frequency LBA update data from the data blocks of the high endurance solid state memory to the data blocks of the low endurance solid state memory.

15. The method of claim 14, further comprising accessing a mapping table to determine physical block addresses in the high endurance solid state memory corresponding to a LBA of the incoming data, and determining a LBA update frequency of the valid data in the data blocks of the high endurance solid state memory in real time by incrementing a counter in the LBA write counter data corresponding to the LBA of the incoming data.

16. The method of claim 14, further comprising:
performing the step of migrating so as to evict the valid low frequency LBA update data to the data blocks of the low endurance solid state memory as part of a garbage collection operation for the memory device;
selecting valid low frequency LBA update data for eviction only from data blocks of the high endurance solid state memory that include more than a defined threshold level amount of invalid data; and
erasing any given data block of the high endurance solid state memory only after all data in the given data block has been invalidated.

17. The method of claim 14, further comprising identifying the high frequency LBA update data as valid data blocks of the high endurance solid state memory having a LBA update frequency that is greater than or equal to a defined high frequency data threshold value; and identifying the low frequency LBA update data as valid data blocks of the high endurance solid state memory having a LBA update frequency that is less than the defined high frequency data threshold.

18. The method of claim 17, further comprising:
monitoring the amount of high frequency LBA update data contained in the the high endurance solid state memory;
lowering the defined high frequency data threshold value when the monitored amount of high frequency LBA update data fills the high endurance solid state memory so as to reduce the amount of high frequency LBA update data contained in the the high endurance solid state memory; and
leaving the defined high frequency data threshold value unchanged when the monitored amount of high frequency LBA update data does not fill the high endurance solid state memory.

19. The method of claim 14, further comprising:
identifying valid medium frequency LBA update data in the data blocks of the high endurance solid state memory that has a LBA update frequency that is less than a LBA update frequency of the high frequency LBA update data and that is greater than a LBA update frequency of the low frequency LBA update data;
migrating the valid low frequency LBA update data from data blocks of the high endurance solid state memory only to a designated low frequency portion of the low endurance solid state memory media; and
migrating the valid medium frequency LBA update data from data blocks of the high endurance solid state memory only to a designated medium frequency portion of the low endurance solid state memory media that is a different portion of the the low endurance solid state memory media from the designated low frequency portion of the low endurance solid state memory media;
never migrating the valid low frequency LBA update data from data blocks of the high endurance solid state memory to the designated medium frequency portion of the low endurance solid state memory media; and
never migrating the valid medium frequency LBA update data from data blocks of the high endurance solid state memory to the designated low frequency portion of the low endurance solid state memory media.

20. The method of claim 14, further comprising migrating the valid low frequency LBA update data to the data blocks of the low endurance solid state memory from data blocks of the high endurance solid state memory only while the host programmable integrated circuit is idle or during system idle time.

\* \* \* \* \*